Figure 1:
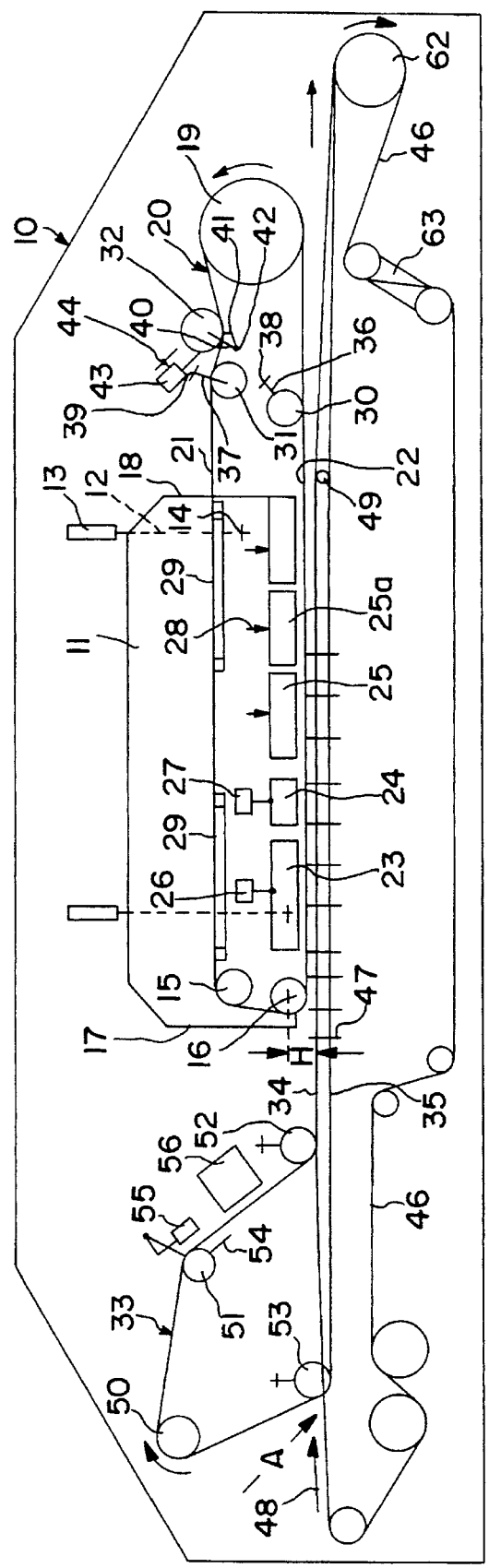

United States Patent
Schwyn

[11] Patent Number: 5,569,144
[45] Date of Patent: Oct. 29, 1996

[54] PROCESS FOR THE PRODUCTION OF TUBE BODIES FOR PACKAGING TUBES

[75] Inventor: Bernhard A. Schwyn, Luzern, Switzerland

[73] Assignee: KMK Karl Magerle Lizenz AG, Zug, Switzerland

[21] Appl. No.: 232,044

[22] PCT Filed: Aug. 25, 1993

[86] PCT No.: PCT/CH93/00211

§ 371 Date: Jun. 27, 1994

§ 102(e) Date: Jun. 27, 1994

[87] PCT Pub. No.: WO94/04343

PCT Pub. Date: Mar. 3, 1994

[30] Foreign Application Priority Data

Aug. 26, 1992 [CH] Switzerland ............ 2641/92-3

[51] Int. Cl.⁶ ............ B29C 53/50; B29C 53/54
[52] U.S. Cl. ............ 493/302; 493/304; 413/72
[58] Field of Search ............ 493/292, 301, 493/302, 303, 304, 305, 300; 413/71, 72, 73

[56] References Cited

U.S. PATENT DOCUMENTS

| | | | |
|---|---|---|---|
| 2,214,624 | 9/1938 | Morsing | 493/302 |
| 2,451,728 | 4/1945 | Gardner et al. | 154/2 |
| 2,741,296 | 4/1948 | Collins | 154/42 |
| 3,133,390 | 5/1961 | Leasure et al. | 493/302 |
| 3,388,017 | 6/1963 | Grimsley et al. | 156/203 |
| 4,266,201 | 10/1980 | Takahashi | 412/71 |
| 4,353,764 | 10/1982 | Sireix | 493/302 |
| 5,061,141 | 10/1991 | Lentz et al. | 413/72 |
| 5,120,177 | 6/1992 | Stieger | 413/72 |

FOREIGN PATENT DOCUMENTS

| | | | |
|---|---|---|---|
| 2021646 | 1/1991 | Canada . | |
| 1652765 | 3/1969 | Germany | 493/292 |
| 691649 | 6/1953 | Sweden | 493/302 |

Primary Examiner—Jack W. Lavinder
Assistant Examiner—Christopher W. Day
Attorney, Agent, or Firm—Bachman & Lapointe, PC

[57] ABSTRACT

Particular aesthetic requirements are made in respect of tube bodies for packaging tubes. An extrusion tube fulfills demands of that kind, better than a foil tube with a welded seam. There is disclosed a process for the production of a foil tube which substantially corresponds to the aesthetic particularities of an extrusion tube.

12 Claims, 2 Drawing Sheets

U.S. Patent    Oct. 29, 1996    Sheet 1 of 2    5,569,144

PROCESS FOR THE PRODUCTION OF TUBE BODIES FOR PACKAGING TUBES

The invention concerns a process as set forth in the classifying portion of claim 1.

Tube bodies, in particular tube members for the production of packaging tubes, are produced using two known processes. In regard to tube bodies which are produced using those processes, a distinction is made between so-called foil tubes and extrusion tubes. After the operation of shaping a web of foil into a tube shape, the foil tubes are formed by welding mutually overlapping edges of the shaped foil web, that operation being referred to as longitudinal seam welding, while extrusion tubes, without a side seam, are formed by means of extrusion, that is to say by pressing liquefied plastic material through extrusion tools.

Foil and extrusion tubes have individual advantages and disadvantages which cause the use thereof to be directed towards certain materials to be packaged. Foil tubes, by virtue of a suitable multi-layer structure of the foil employed, can be relatively easily adapted to delicate or sensitive materials to be packaged, for example materials containing expensive and volatile fragrance constituents, while for the same purpose, that is to say as a diffusion barrier, when using an extrusion tube, individual tube bodies have to be fitted one into the other. The advantage of simple adaptability to the packaging material, in respect of foil tubes, is reduced in significance, in comparison with the extrusion tube, by virtue of the presence of the visible longitudinal welded seam, insofar as the aesthetic appearance of a tube of that kind will be adversely affected by the seam. Due to the welding operation, it is not possible to apply printing around a foil tube, in contrast to an extrusion tube without a welded seam. After an extrusion tube has been separated from an elongate tube portion issuing from an extruder, printing is applied to the extrusion tube by mounting it on a mandrel and rolling it against one or more rotary printing rollers. That method of applying printing sets clear limits in regard to the quality of printing that can be achieved, in that image reproductions are not satisfactory in all parts of the printing, in regard to the degree of sharpness thereof. Half-tone qualities are also subject to visible limits. Those limitations do not occur in the case of foil tubes as printing is applied to the foils while in the flat condition, before they are shaped and before the edge welding operation. Although the extrusion tube is inferior to the foil tube in regard to technical adaptation to packaging material and quality of printing, the extrusion tube is preferred by the cosmetic industry for packaging high-quality cosmetic products, because of the absence of the longitudinal seam, even if the qualities of printing therearound are unsatisfactory. There are therefore tube characteristics of aesthetic nature, which ensure that an extrusion tube is preferably used for products of the above-indicated kind in the cosmetic industry.

In consideration thereof, the object of the present invention is to provide a process for the production of tube members, which is of such a nature that tube members produced in accordance with that process combine the advantages but not the disadvantages of the known foil and extrusion tubes.

In accordance with the invention that object is attained by the features recited in the characterising portion of claim 1.

The object of the present invention is attained by means of a foil tube with a novel edge welding configuration. It is known for the edges to be welded together in an overlapping position, so that the edges at least partially flow one into the other during the welding operation. That welding method presupposes a relatively high perpendicular pressure applied to the peripheral surface of the edges, that is to say the edge or edge portion, constituting the inner and outer edges after shaping of the tube body, of the foil strip of fusible plastic materials, so that visible deformations remain behind on the outer surface of the foil tube, due to the use of pressing tools, in the form of the welded seam. That welding procedure results in secure seams with mechanical and technological properties which are equal to or better than those of the foils used. That is the reason why hitherto the processes involved in the production of foil tubes only involved the operation of welding the edges in overlapping relationship.

Surprisingly, it has now been found that the butt welding operation according to the invention, or the operation of welding the longitudinally directed cut surfaces of the foil web, produces welded seams of the same reliability, that is to say with mechanical and technological properties which are of the same or comparable order of magnitude, from the functional point of view, as those of an overlapping welding operation.

It has also been found that, in comparison with the known welding process, less energy has to be applied for carrying out the process according to the invention, for fusing and joining the cut surfaces in the weld region formed from a respective edge portion adjoining a perpendicular cut surface. A further consideration in regard to the smaller amount of energy involved, as an advantage in this respect, is the fact that, with the process according to the invention, foil surfaces consisting of fusible materials, for example fusible plastic materials, are subjected to lesser adverse effects (damage) so that a seam produced in accordance with the invention has a smooth surface with the same brightness or shine as the material of the foil tube so that the seam is not so clearly visible. In addition, the fact that a smaller amount of energy is involved means that printing inks on the foil are not visibly impaired or damaged, as in the case of the known process. That means that it is possible to apply printing as far as the edge, that is to say the edges of the foil, so that after the operation of forming the foil into a tube, there is the impression of a tube member which has printing all around it.

The features of the claims following claim 1 set forth advantageous developments of the process according to the invention, as recited in claim 1.

Figure 2:
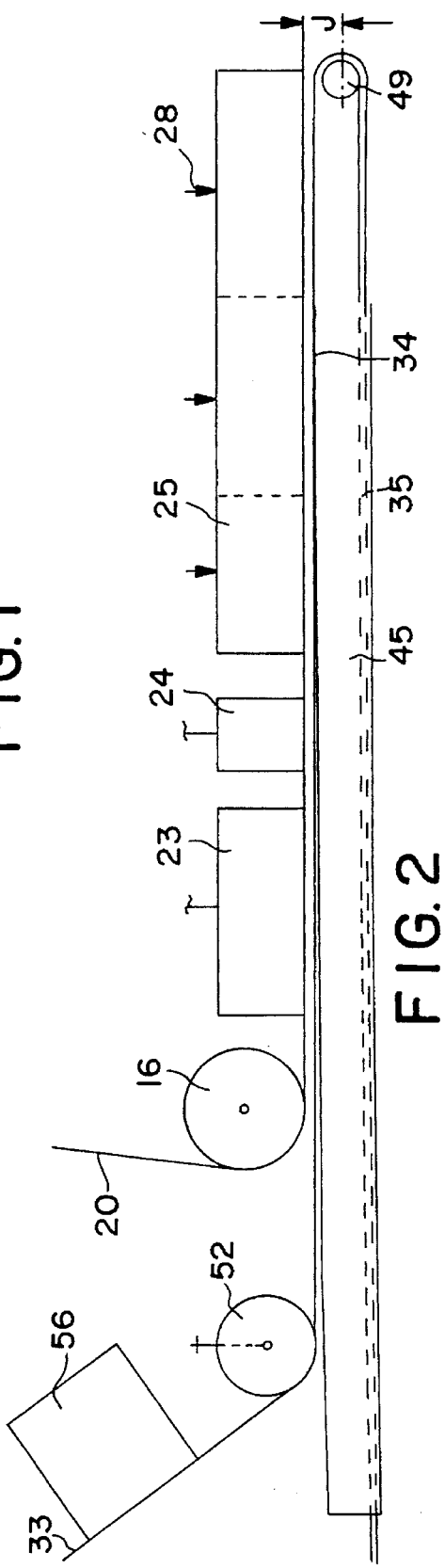
Figure 3:
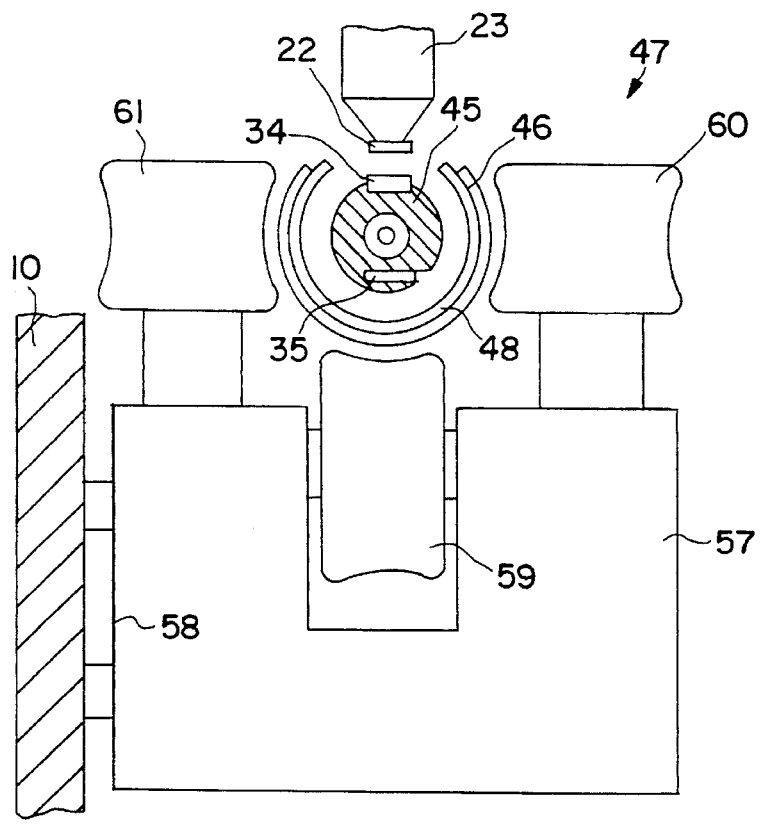
Figure 4:
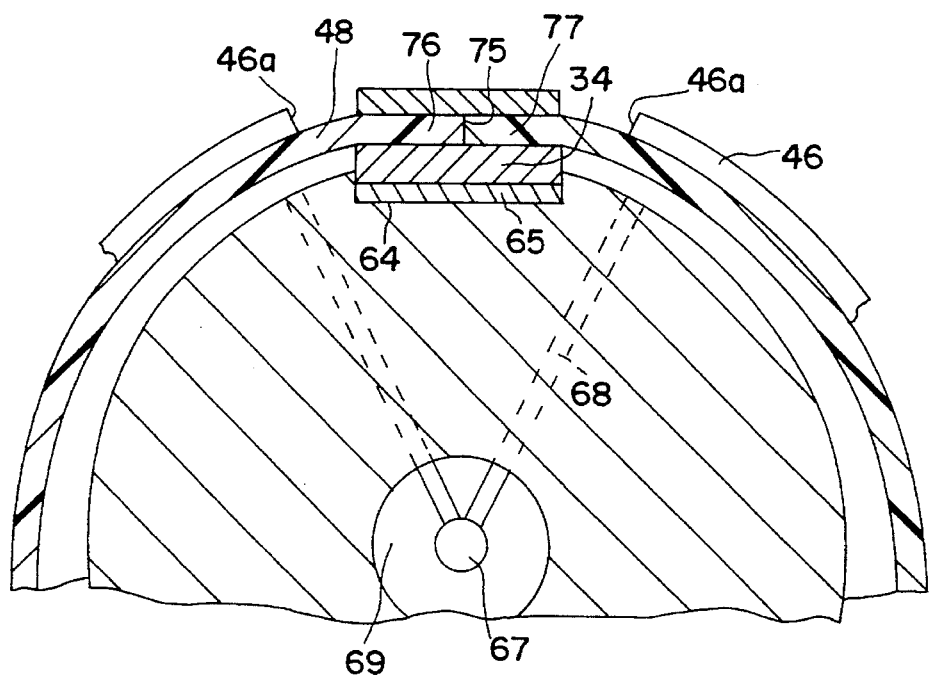

Further advantages, features and details of the invention will be apparent from the following description of a preferred embodiment of the process according to the invention, shown in conjunction with a preferred apparatus for carrying out the process, and the drawing. In the drawing:

FIG. 1 is a diagrammatic side view of an apparatus for the production of tube bodies for packaging tubes, FIG. 2 shows a tube-formation region of the apparatus on a larger scale than FIG. 1, FIG. 3 shows a view of a shaping element taken along section line A—A in FIG. 1, and FIG. 4 is a view on an enlarged scale of the operation of positioning and pressing a plastic foil on a mandrel.

The apparatus shown in FIG. 1 for carrying out the process according to the invention for the production of tubular bodies comprises a base plate 10 on which a carrier plate 11 is mounted movably in a vertical direction. The movable mounting is provided by means of control members 12 disposed between the base plate 10 and the carrier plate 11. Each control member 12 is fixed at its upper end 13 to the base plate 10 and at its lower end 14 to the carrier plate 11 so that the carrier plate 11 can be vertically positioned and fixed in position, by means of the control members 12.

The diagrammatically illustrated control members 12 are preferably pneumatically activatable control members whose upper end 13, being the piston housing, is fixed to the base plate 10, while the lower end 14 thereof, being the free end of the respective piston rod, is engaged with the carrier plate 11.

At its forward lower ends 17 the carrier plate 11 carries a freely rotatably mounted roller 16 and at a spacing thereabove a roller 15 of like configuration, the positions of the axes of the rollers not being variable.

Arranged on the base plate 10 at a spacing from the rearward end 18 of the carrier plate 11 is a drive roller 19 whose diameter corresponds to the spacing between the axes of the rollers 15 and 16 plus the sum of half the diameters of the rollers 15 and 16.

Passing around the drive roller 19 and the rollers 15 and 16 is an endless metal conveyor belt 20 with an upper belt run 21 and a lower belt run 22 which extend parallel to each other by virtue of the diameter of the drive roller 19 and the dimensions and positions of the upper roller 15 and the lower roller 16.

The spacings of the upper roller 15 and the lower roller 16 from the carrier plate 11 and the spacing of the drive roller 19 from the base plate 10 are such that the conveyor belt 20 moves at a uniform spacing from and in front of the surface of the carrier plate 11; the reference to the front surface of the carrier plate means the surface of the carrier plate, which is opposite to the surface thereof that carries the pivotal mountings of the lower free ends 14 of the control members 12.

A heating device 23, a pressing device 24 and a cooling device 25 are arranged on the carrier plate 11 in succession in the direction of movement of the conveyor belt 20, downstream of the lower roller 16, between the upper belt run 21 and the lower belt run 22 and cooperating with the inward side of the lower belt run 22. The heating device 23, the pressing device 24 and the cooling device 25 are of a rail-like or bar-like configuration and are so mounted on the carrier plate 11 that they are movable in a vertical direction.

For the purposes of vertical displacement, the heating device 23 is connected to a control member 26, for example in the fore of a pneumatic cylinder with piston rod. The pneumatic cylinder housing is connected to the carrier plate 11 and the free end of the piston rod is connected to the heating device 23 so that suitable activation of the control member 26 can produce a vertically directed upward or downward movement of the heating device 23.

The heating device 23 includes, extending in its longitudinal direction, preferably a high-frequency heating means which operates inductively and which in the operating condition generates heat and transmits it to the lower belt run 22 of the conveyor belt 20 and to the upper belt run 34 of the metal conveyor belt 33. To provide for uniform warming or heating of the lower belt run 22 and the upper belt run 34, it is essential that the heating device 23 is not only adjustable vertically for the purposes of adjusting for example its contact pressure against the inward side of the lower belt run 22, but is also adjustable in the direction of movement of the lower belt run 22, for example in alignment with or extending in the same direction as the centre line thereof; that can be effected by varying the longitudinal position of the heating device 23 relative to the carrier plate 11.

Like the heating device 23, the pressing device 24 is mounted displaceably in the vertical direction on the carrier plate 11 by way of a control member 27 in the form for example of a pneumatic cylinder with piston rod, so that irrespective of the contact pressure of the heating device 23, a variable pressing force can be applied by the pressing device 24 against the inside of the lower belt run 22, to influence the flow characteristics of various plastic materials.

Vertical displaceability of the heating device 23 and the pressing device 24 serves overall for three purposes. On the one hand, in that way the apparatus can be set for dealing with foils of different thicknesses. In addition, by virtue of adjustments to the contact pressure, temperature and pressing pressure, it is possible to set material-specific values in respect of the plastic materials used. In addition, vertical displaceability serves to compensate for or correct fluctuations in thickness of the plastic foils. For the latter purpose, the apparatus has measuring sensors (not shown) which sense the appropriate values and pass the to the control members, for displacement purposes.

At the rearward end of the carrier plate 11, downstream of the pressing device 24, the cooling device 25 is in sliding engagement with the inward side of the lower belt run 22.

In the present case the cooling device 25 comprises three cooling blocks or units 25a which are mounted for limited movement in a vertical direction in a common holding means on the carrier plate 11.

Compression springs 28 are provided between the holding means and the respective side of each cooling block or unit 25a, being the side which is opposite the inward side of the lower belt run 22. The compression springs 28 apply a pressing force towards the inside of the lower belt run 22 so as to ensure guaranteed contact for the purposes of uniform transfer of heat from the lower belt run 22 to the cooling device 25.

If there is a wish for the amount of heat removed from the lower belt run 22 to increase or decrease in the direction of movement of the lower belt run 22, in the cooling device 25, that can be effected in each cooling block or unit 25a by the installation of compression springs 28 producing correspondingly greater or weaker spring forces.

In order to maintain a uniform heat absorption capability, the cooling blocks or units of the cooling device 25 are cooled with a heat-absorbent fluid, preferably by means of air or a flow of water which is passed through the cooling blocks or units. By adjusting the amount of coolant per unit of time, it is possible to adjust the heat absorption capability or the amount of heat removed from the lower belt run, in accordance with requirements which are specific to the material to be welded.

Upstream of the pressing device 24, the plastic material experiences preliminary setting or hardening (the degree of preliminary hardening is dependent on the material), and the pressing device 24 is also cooled adjustably in the manner of the cooling device 25 so that the pressing operation and the entry into the cooling device 25, while the apparatus is operating, can take place at the same respective temperature which, like the degree of preliminary hardening of the plastic material, is specific to the material, that is to say specific to the plastic material used.

Arranged above the heating device 23, the pressing device 24 and the cooling device 25, on the carrier plate 11, are one or more cooling bars or rails 29 which co-operate with the inward side of the upper belt run 21. The cooling bars 29 are cooled by means of water and cool down the upper belt run 21 to such an extent that it always passes into the heating device, as the lower belt run, at a constantly uniform temperature, after it has been guided around the rollers 15 and 16.

Disposed between the inward sides of the upper belt run 21 and the lower belt run 22 are two freely rotating adjusting rollers 30 and 31 which act on the belt runs. Arranged between the adjusting roller 31 and the drive roller 19 is a further, freely rotating adjusting roller 32 which acts on the outward side of the upper belt run 21.

With the position of the axis of the drive roller 19 not being adjustable, the adjusting rollers 30, 31 and 32 are provided on the one hand for the purpose of providing adjustment in respect of parallelism of the upper belt run 21 on the cooling blocks or units 29 and the lower belt run 22 on the heating device 23, the pressing device 24 and the cooling device 25, upon a variation in the vertical position of the axis of the roller 16, as indicated at 'H', relative to the position of the upper run 34 of the endless steel belt 33.

In addition to adjusting the upper belt run 21 and the lower belt run 22, the adjusting rollers 31 and 32 also serve for adjusting the tension of the conveyor belt 20 and keeping it constant. The adjusting rollers 30 and 31 are movably mounted by means of roller holders 36 and 37 respectively on the base plate 10, at the same spacing as the rollers 15 and 16 from the base plate 10. Each roller holder 36, 37 carries a roller at one free end while at its other end it is mounted to an anchorage 38, 39 which is fixed on the base plate 10. The roller holders 36, 37 are adapted to be pivotable and displaceable relative to the anchorages 38 and 39 so that the spacing between the anchorages 38, 39 and the axes of the respective adjusting rollers 30 and 31 can be varied and the adjusting rollers 30 and 31 are movable at a radially variable distance around the anchorages 38 and 39.

The adjusting roller 32 is mounted to the base plate 10 by means of an elbow lever consisting of two legs 40 and 41.

The legs 40 and 41 are at a fixed aperture angle relative to each other and at their point of intersection, they are mounted rotatably about a fixed anchorage 42. The leg 40 carries the adjusting roller 32 at its free end while the free end of the leg 41 is connected to a pneumatic or hydraulic control member 43 so that, when the control member 43 is actuated, the adjusting roller 32 is movable about the anchorage 42, to adjust the tension of the conveyor belt 20. To keep the belt tension constant, the arrangement includes a sensor 44 which senses the tension of the belt and/or its temperature and which produces suitable movements of the control member 43 for keeping the belt tension constant.

The part of the apparatus for forming a tube body includes a mandrel 45, a shaping belt member 46 which is driven in circulation and which carries a plastic foil strip 48 on its side which is towards the mandrel 45, and a plurality of shaping elements 47 which are arranged at a spacing from each other in the longitudinal direction of the mandrel 45 and which deform the shaping belt meter 46 and the foil strips 48 around the periphery of the mandrel 45. The mandrel 45 which is of round cross-section is fixedly disposed on the base plate 10. As shown in FIG. 2, it extends in the same direction as and at a spacing from the heating device 23, the pressing device 24 and the cooling device 25. The upper belt run 34 of the endless, driven conveyor belt 33 which is made of metal moves on the outside surface of the mandrel 45, being guided in a groove 64 in the longitudinal direction thereof. The conveyor belt 33 slides at the front end of the mandrel 45 around a direction-changing roller 49 and is taken back as a lower belt run 35 in the mandrel. The groove 64 is provided at its bottom with an insulation 65 for preventing dissipation of the heat generated in the upper belt run 34. Thus, formed between the upper belt run 34 of the conveyor belt 33 and the lower belt run 22 of the metal conveyor belt 20 is a gap in which the mutually abutting edges of the foil 48, for the formation of a longitudinally extending welded seam, are firstly fused while being held under pressure against each other, smoothed and then cooled.

As shown in FIG. 1, the conveyor belt 33 passes around a drive roller 50 which is fixedly arranged on the base plate 10, a freely rotatable adjusting roller 51 arranged at the inside of the conveyor belt, an adjusting roller 52 which is arranged at the outside of the conveyor belt and which guides the upper belt run 34 into the guide groove 64 in the mandrel 45 and which, in conjunction with the direction-changing roller 49, ensures that the belt is properly horizontally positioned relative to the hot tern of the guide groove, a direction-changing roller 49 which is not displaceable in regard to the position of its axis, and an adjusting roller 53.

The adjusting rollers 51, 52 and 53 are mounted on the base plate 10, like the adjusting rollers 30, 31 and 32. The adjusting roller 51 also keeps the belt tension constant, by way of a sensor 54 for sensing temperature and/or belt tension, and a control member 55. By virtue of that arrangement, when using different mandrel diameters, it is possible to adjust the spacing 'J' between the longitudinal axis of the mandrel and the lower belt run 22, while maintaining parallelism of the lower belt run 22 relative to the upper belt run 34 and the lower belt run 35 relative to the upper belt run 34.

For the purposes of heating the conveyor belt 33 to at least the entry temperature at which the lower belt run 22 enters the heating device 23, a resistance heating means 56, preferably in the form of a high-frequency coil, is disposed upstream of the adjusting roller 52.

FIG. 3 shows a shaping element 47 with a sectional view of a mandrel 45 which is mounted within the shaping element 47, and the heating device 23 which is disposed above the mandrel 45. The shaping element 47 comprises a carrier block 57 which is fixed at its side 58 to the base plate 10. The shaping element 47 carries three freely rotatable shaping rollers 59, 60 and 61. The shaping roller 59 which is disposed beneath the mandrel 45 rotates about a horizontal axis while the shaping rollers 60 and 61 which are respectively arranged laterally of the mandrel 45 rotate about vertical axes which are adjustable eccentrically for fine adjustment of the magnitude of the contact pressure of the vertical cut surfaces or foil edges, also referred to hereinafter as edges 75 for the sake of brevity, which bear against each other.

Going from the first shaping element 47 to the shaping element 47 which positions edges of a foil 48 in a condition of bearing against the upper belt run 34 of the conveyor belt 33, the spacings of the horizontal and vertical axes of rotation decrease towards the centre point of the mandrel 45, so that the convexly shaped contact surfaces of the shaping rollers 59, 60 and 61 deflect the shaping belt member 46, which moves between the rollers 59, 60, 61 and the mandrel 45, with the foil 48 lying on the shaping belt member 46, around the mandrel 45, in the longitudinal direction. The width of the shaping belt member 46 is less than the width of the web of foil lying thereon.

The foil 48 is guided into a condition of bearing against the mandrel 45 only to such an extent that edges of the foil 48 butt against each other between the lower belt run 22 of the conveyor belt 20 and the upper belt run 34 of the conveyor belt 33, and are held in that position under pressure against each other by the edges of the shaping belt member 46; however the inside surface of the tubular member formed in that way does not bear against the outside surface of the mandrel 45, in order to avoid frictional forces.

In that way, when dealing with plastic monofoils, including laminates consisting of plastic foils of different chemical compositions, the edge regions or edge portions 76 of the edges 75, which edge regions bear against each other and are fused in the heating device 23, are prevented from being torn away from the material of the tube wall, which is not fused in the respectively adjoining portions; that ensures a uniform density and a tear-free welded seam at the outer edges of the tube body. As soon as the welded seam is of a predetermined level of mechanical strength and rigidity, by virtue of heat having been removed therefrom, the spacings between the axes of the shaping rollers 59, 60 and 61 of the successively disposed shaping elements 47 increase again from the centre point of the mandrel 45 so that the shaping belt member 46 opens and the shaping belt member 46 with tube, after release of the tube from the lower belt run 22 and the upper belt run 34, can come off the mandrel 45 substantially in the longitudinal direction relative thereto.

As shown in FIG. 1, the endless shaping belt member 46 which preferably comprises easily deformable fibre-reinforced plastic material is driven by way of a drive roller 62 and guided over a belt-tensioning device 63 and around further direction-changing rollers.

The drive roller 62, the belt-tensioning device 63 and the direction-changing rollers are disposed on the base plate 10 at such a spacing that the centre line of the shaping belt member 46 coincides with the perpendicular centre line of the mandrel 45 so that, when the shaping belt member 46 passes through the shaping elements 47, the edges 46a of the shaping belt member 46 are always disposed in opposite relationship in a substantially horizontal plane, possibly being assisted in that respect by eccentric and pivotal adjustment of the shaping rollers 60 and 61; that ensures that the foil edges 75 bear against each other satisfactorily, with a predetermined contact pressure.

For the production of a satisfactory welded seam on tubular bodies comprising plastic monofoils or plastic/metal or plastic laminate foils, it has been found advantageous, in particular in regard to the surface configuration thereof and to prevent molten plastic material from being squeezed out along the edges which bear against each other and to prevent stresses and stretching phenomena in and at the edges of the welded seam, if the conveyor belts 20 and 33 and the shaping belt member 46 move at the same peripheral speed, so that there is no relative movement between the lower belt run 22 and the edges of the foil 48, the edges of the foil 48 and the upper belt run 34, and between the shaping belt member 46 and the foil 48 lying thereon, whereby the butting foil edges 75 which are held under a substantially horizontally directed contact pressure in the rest condition between the moving conveyor belts 20 and 33 are fused in order first to flow one into the other, they are further combined in a condition of having experienced preliminary hardening, under a perpendicular pressure, they are shaped (smoothed) and then cooled down.

For that purpose, the drive rollers 19, 50 and 62 are controlled in such a way as to be matched to each other in regard to their drive speeds of rotation, and the belt tensioning device 63 and the adjusting rollers 32 and 51 are so activated in their adjusting positions that the belts 20, 33 and 46 are under a uniformly predetermined tension.

FIG. 4 shows each of the edges 75 in the form of a smooth, perpendicularly extending cut edge. It is also in accordance with the invention for the edges 75 to be cut at an angle so that the butting line, when the edges 75 formed in that way bear against each other, would not extend perpendicularly as shown in FIG. 4, but would be inclined. Good strength values have been found to exist when using inclined surfaces at angles of 20° to 60°, preferably 40° to 45°. It is also possible in accordance with the invention for the edges 75 to be of a stepped configuration, so that the steps are brought into engagement with each other in the operation of forming the tube body.

In accordance with the process according to the invention, a tube body is produced for example from a multi-layer plastic foil, by means of the apparatus described for carrying out the process, in the following way:

At the location A, the foil 48 passes in a flat condition on to the shaping belt member 46 which is also moving in a flat condition. While lying flat, the foil 48 is carried by the shaping belt member 46 to the shaping elements 47. The mandrel 45 is disposed above the foil 48. In the shaping elements 47, the shaping belt member 46 with foil 48 lying thereon is shaped around the mandrel 45 by way of the shaping rollers 59, 60 and 61, in a substantially circular configuration with decreasing diameter, until the edges 75 of the foil 48 bear against each other under a predetermined contact pressure. The width of the shaping belt member 46 is such that, after the edges of the foil bear against each other, the mutually oppositely disposed edges of the shaping belt member 46 do not cover over the contact region of the edges 75, for the purposes of carrying out a subsequent treatment operation thereon, but rather the edges of the shaping belt member 46 form between them a gap which extends in the longitudinal direction of the tube body and in which the contact region of the edges of the foil is exposed.

For fine adjustment of the predetermined contact pressure at the edges of the foil 48, the shaping rollers 60 and 61 can be displaced by means of their eccentric adjustment and their pivotal adjustability. The pressure applied to the edges 75 for example in a tangential direction relative to the tube body in the region in which the edges 75 of the foil 48 butt against each other is developed by way of the shaping belt member 46, that is to say by means of the friction between the shaping belt member 46 and the foil 48 and the curvature of the shaping belt member 46.

After the operation of forming the edge butting region of the edges 75 (also cut edges) of the foil 48, the latter lies on the upper belt run 34. The operation of shaping the foil; 48 and the shaping belt member 46 takes place in such a way that only the butting region lies on the upper belt run 34, but otherwise there is no contact between the foil 48 and the mandrel 45, in order to eliminate friction between the stationary mandrel 45 and the moving foil 48.

In order to maintain a given operating temperature, the mandrel 45 is provided with a duct or passage 69 which is disposed in its interior and through which a cooling medium flows. Also disposed in the interior of the mandrel is an air duct means comprising a bore 67 which extends in the longitudinal direction of the mandrel 45, and bores 68 which extend radially therefrom, in the region of the pressing device 24, in a direction towards the direction-changing roller 49, as far as the end of the mandrel 45; the bores 68 open at the periphery of the mandrel 45 and, if necessary, supply air for cooling purposes, for reducing friction and for calibration of the tube diameter, into the space between the surface of the mandrel and the inside wall surface of the tube.

After the formation of the butting region formed from two edge regions 76, 77, that region passes in between the conveyor belts 20 and 33, and, as that happens, the contact pressure is preferably maintained while the conveyor belts may also apply a pressure to the butting region in a perpendicular direction for the above-mentioned purposes (positioning of the edges, shaping, that is to say smoothing the welded seam, and affording good heat transfer froth the conveyor belts to the edge-contact region).

The lower belt run 22 is in contact with its inward side with the heating device 23 which, in the case of metal conveyor belts 20 and 33, heats the belts by high-frequency induction to a temperature which is sufficient to raise the plastic material to a temperature required for the welding operation under pressure.

After the heating effect is shut off, the fused edge-butting region passes beneath a pressing device 24 which acts on the inside of the lower belt run 22 and which causes the edges of the butting region to run one into the other under pressure and at the same time produces a smoothing effect and a cooling action so that, having been subjected to preliminary hardening in its required configuration, it passes into the adjoining cooling device. In the cooling device 25, the residual heat which is required for the edge-butting region to attain its necessary mechanical strength is removed from that region, via the lower belt run 22.

After the edge-butting region has attained a given level of mechanical strength, the shaping belt member 46 is opened by virtue of the fact that the spacings of the axes of the shaping rollers 59, 60 and 61 of the shaping elements 47 increase relative to the periphery of the mandrel 45, so that the welded tube member can freely come away from the mandrel 45 for further processing thereof, for example for separating it into individual portions.

For the production of stress-free and tear-free welded seams for tube bodies of plastic foils, it is essential that no relative movement occurs during the operation of forming the welded seem, between the surfaces of the edge-butting region and the belt runs cooperating with those surfaces, and between the foil 48 and the shaping belt member 46. For that purpose the conveyor belts 20 and 33 and the shaping belt member 46 are driven at the same speed and are held at a constantly uniform tension in order to eliminate stretching due to the effect of heat, and thus individual variations in speed; it is also equally significant for the upper conveyor belt 20 to be in the form of a one-part, endless conveyor belt 20 which passes under the heating device 23, the pressing device 24 and the cooling device 25.

I claim:

1. A process for the production of tubular bodies, comprising the steps of:

providing a foil formed from a weldable plastic material, said step of providing including providing said foil in web form, said foil having an upper surface and longitudinally extending edges having edge portions, wherein said edge portions have shapes which allow for their fusing together via the application of pressure in a plane substantially parallel to a tangent to said periphery of said tubular body along with the application of heat, said shapes comprising said edge portions having faces extending substantially perpendicular to said upper surface;

shaping said foil into a tubular body having a periphery by abutting said edge portions against each other, said step of shaping performed via a shaping element, a shaping belt member and a mandrel, whereby said foil is laid around said mandrel; and applying pressure in a direction substantially parallel to a tangent to said periphery in an area of said edge portions and applying heat to said edge portions, said step of applying including fusing together said faces of said edge portions and forming a welded seam while said foil is in the shape of said tubular body.

2. The process according to claim 1, wherein said foil has an upper surface, portions to extend at an angle relative to said upper surface of said foil.

3. The process according to claim 2, wherein said edge portions are formed to extend at an angle of 20–60 degrees relative said upper surface of said foil.

4. The process according to claim 3, wherein said edge portions are formed to extend at an angle of between 45–45 degrees relative said upper surface.

5. The process according to claim 1, wherein said step of forming said edge includes forming portions to have a stepped configuration.

6. The process according to claim 1, wherein said step of applying pressure further includes the step of adjusting said pressure by means of eccentrically and pivotally displacable shaping rollers.

7. The process according to claim 1, wherein said step of applying pressure is performed between two spaced apart belt runs of two conveyor belts.

8. The process according to claim 6, wherein said step of applying pressure includes applying said pressure via edges of belt runs radially relative to a centerpoint of said tubular body.

9. The process according to claim 7, further including the step of heating said belt runs independently of each other.

10. The process according to claim 1, further including the step of accommodating said edge portions between belt runs, wherein an inside surface of said tubular body is held at a spacing relative to a mandrel.

11. The process according to claim 8, wherein said steps of applying pressure and adjoining said edge portions further includes the steps of fusing said edge portions together for forming said welded seam, subjecting said edge portions to preliminary hardening, and subjecting said edge portions to a shaping pressure and cooling said edge portions.

12. The process according to claim 1, wherein said pressure is applied horizontally in the area of said welded seam.

* * * * *